United States Patent
Doi et al.

(10) Patent No.: US 6,753,629 B2
(45) Date of Patent: Jun. 22, 2004

(54) BRUSHLESS DC MOTOR

(75) Inventors: Hirofumi Doi, Tokyo (JP); Mutsuo Sekiya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 21 days.

(21) Appl. No.: 09/945,751

(22) Filed: Sep. 5, 2001

(65) Prior Publication Data

US 2002/0117914 A1 Aug. 29, 2002

(30) Foreign Application Priority Data

Feb. 23, 2001 (JP) ........................................ 2001-049290

(51) Int. Cl.[7] ........................ H02K 11/00; H02K 21/12; H02K 1/27
(52) U.S. Cl. ...................... 310/68 D; 310/68 R; 310/85; 310/88; 310/89; 310/71; 310/156.05; 310/66
(58) Field of Search ....................... 310/156.05–156.09, 310/68 D, 68 R, 87–89, 85, 66, 71

(56) References Cited

U.S. PATENT DOCUMENTS

| 1,379,334 | A | * | 5/1921 | Dean .................... 310/156.18 |
| 2,744,202 | A | * | 5/1956 | Horvath et al. ............... 310/71 |
| 3,845,334 | A | * | 10/1974 | Harada et al. ......... 310/156.05 |
| 4,529,900 | A | * | 7/1985 | Uzuka ......................... 310/43 |
| 4,850,812 | A | * | 7/1989 | Voight ....................... 310/68 R |
| 5,053,664 | A | * | 10/1991 | Kikuta et al. ............. 310/68 B |
| 5,256,924 | A | * | 10/1993 | Fischer ................... 310/156.08 |
| 5,565,721 | A | * | 10/1996 | Knappe ..................... 310/68 B |
| 5,714,820 | A | * | 2/1998 | Mitsuhashi et al. ......... 310/105 |
| 6,065,946 | A | * | 5/2000 | Lathrop ................. 417/423.14 |
| 6,268,669 | B1 | * | 7/2001 | Wakao et al. ............. 310/68 R |
| 6,333,576 | B1 | * | 12/2001 | Ishikawa et al. ............... 310/85 |
| 6,462,450 | B1 | * | 10/2002 | Haussecker et al. ... 310/156.09 |

FOREIGN PATENT DOCUMENTS

| JP | 03118742 A | * | 5/1991 | ............ H02K/5/08 |
| JP | 03128638 A | * | 5/1991 | ............ H02K/5/08 |
| JP | 03178542 A | * | 8/1991 | ........... H02K/11/00 |
| JP | 05236694 A | * | 9/1993 | ............ H02K/5/08 |
| JP | 06086494 A | * | 3/1994 | ............ H02K/5/06 |
| JP | 7-143715 | | 6/1995 | |
| JP | 8-191562 | | 7/1996 | |
| JP | 11-346497 | | 12/1999 | |

* cited by examiner

Primary Examiner—Burton S. Mullins
Assistant Examiner—J. Aguirrechea
(74) Attorney, Agent, or Firm—Sughrue Mion, PLLC (57) ABSTRACT

A brushless DC motor includes: a motor section which has a rotor, a stator and a housing; a control circuit section which is integrated with the motor section and separated from the motor section by a partition; and a casing member which covers the control circuit section to isolate the control circuit section from the external environment. A position detection means is disposed outside of a bearing member with respect to an axial direction.

8 Claims, 7 Drawing Sheets

BRUSHLESS DC MOTOR

BACKGROUND OF THE INVENTION

1. Field of the Invention

The present invention relates to a brushless DC motor used as a driving source for a moveable vane of a VG Variable Geometric) turbo system, an EGR (exhaust gas recirculation system) valve or a throttle valve used in on-vehicle equipment.

2. Description of Related Art

A conventional brushless DC motor, as disclosed for example in JP-A-11-346497, is constituted by a rotor which retains a permanent magnet having magnetic poles on an outer periphery, a bearing portion which rotatably supports the rotor, a stator with current-carrying coils wound thereon which is disposed on an outer side of the rotor, a rotation position detection means which switches the power supply to the plurality of coils retained on the stator in accordance with the position of the rotor, a housing which stores the above components, and a control circuit for controlling the drive operation of the motor.

Figure 7:
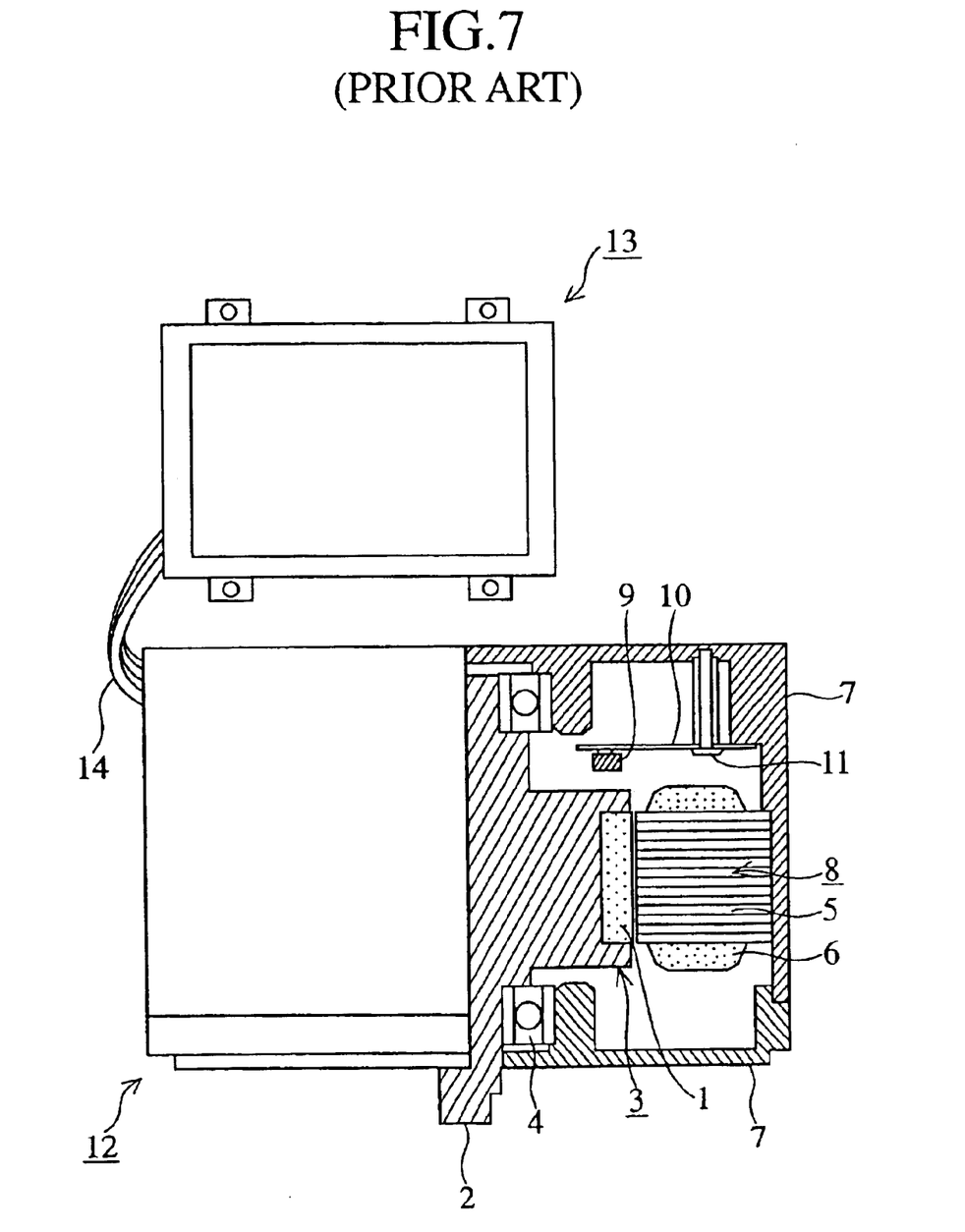
FIG. 7 shows the structure of a conventional brushless DC motor.

The structure of a general brushless DC motor similar to the above motor will be described with reference to FIG. 7.

In the figure, reference numeral 1 denotes a permanent magnet, 2 is an output shaft, and 3 is a rotor. The permanent magnet 1 which is magnetized with a fixed number of magnetic poles is mounted on the outer periphery of the output shaft 2. 4 denotes a bearing which rotatably supports both end portions of the rotor 3. 5 is a core which faces with the outer peripheral face of the permanent magnet 1 disposed on the outer periphery of the rotor 3. 6 is a coil wound on the core 5 for generating an electromagnetic force in the core 5 by the application of a current. 7 is a housing which supports the outer periphery of the core 5. 8 is a stator which is constituted by the core 5 and the coils 6 and which is fixed in the housing 7. 9 is a Hall device which is arranged in proximity to one axial end face of the permanent magnet 1 disposed on the outer periphery of the rotor 3. The Hall device 9 detects the rotation position of the rotor 3 by sensing the leakage flux in an axial direction of the permanent magnet 1. 10 is a base plate which supports the Hall device 9 in proximity to the axial end face of the permanent magnet 1. 11 is a threaded section for fixing the base plate 10 on the housing 7. 12 is a motor section containing all the above constituent elements.

13 is a control circuit section for driving the motor section 12, and the control circuit section 13 is normally provided in a separate position to the motor section 12. 14 is a harness for placing the motor section 12 and the control circuit section 13 in electrical connection.

In the conventional brushless DC motor constituted as above, the rotational angular position of the rotor 3 is detected by a plurality of Hall devices, the current applied to each coil 6 arranged in three-phase is switched in response to the output signal. As a result, attractive and repulsive forces alternate with respect to each pole of the permanent magnet 1 on the rotor 3 and results in the generation of a rotation torque in the rotor 3.

Further, in the conventional brushless DC motor constituted as above, the Hall device is frequently used as a position detection means for the rotor, which detects the leakage magnetic flux from the permanent magnet of the rotor and to convert it into an electrical signal. Thus, it is necessary to dispose the Hall device in a position adjacent to the axial end face of the permanent magnet provided in the rotor. The precise position is shown in FIG. 11 of the publication JP-A-11-346497 in which it is necessary to arrange the Hall devices on the inner side of the bearing members supporting the rotor.

The control circuit section which switches the power supply to the coils in accordance with the positional signal must be disposed in a separate position to the motor due to problems related to the heat resistance characteristics of the electronic components, and thus, the motor and the control circuit section are electrically connected by a harness.

Since the conventional brushless DC motor is constituted as above, a harness must be provided in order to electrically connect the motor with the control circuit section when the motor and the control circuit section are provided separately. Furthermore, a motor, a casing member for each control circuit section and a seal or similar component for the harness extraction section from the casing member are required. This structure is not only expensive but in addition requires a housing for storing the control circuit section and additional space for arranging the housing.

In order to integrate the motor and the control circuit section, the control circuit section must be mounted on the base plate for the Hall device which is disposed in proximity to the permanent magnet on the rotor. However, the problem of heat damage on the control circuit section due to heat generated by the coils is not avoided.

Further, when the control circuit section is mounted on an another base plate than the base plate for the Hall device and is integrated with a motor, it is necessary to electrically connect the base plate for the Hall device and the base plate for the control circuit section with a harness or the like. As a result, structural complexity is increased, freedom of design with respect to component shape is limited and manufacturing costs increase.

Furthermore, since large temperature variations result from generation of heat by the coils in a tightly-closed motor, it is sometimes the case that a breathing phenomenon is generated due to a pressure difference between the atmospheric pressure and the pressure in the motor. For example, when moisture enters into the motor as a result of the breathing, the possibility exists that short circuits or insulation failure may result from the moisture entering into the control circuit section.

SUMMARY OF THE INVENTION

The present invention is proposed to solve the above problems and has the object of providing a brushless DC motor with simplified and cost-effective structure of circuit connection section, in which the control circuit section is integrally mounted in a position not affected by heat generation from the coils.

According to the present invention, there is provided a brushless DC motor comprising: a motor section having a rotor, a stator and a housing; a control circuit section which is integrated with the motor section and which is partitioned from the motor section; and a casing member for isolating the control circuit section from the external environment, wherein a position detection means is disposed outside of a bearing member with respect to the axial direction.

Here, according to the present invention, the partition may be formed by at least one of the housing constituting the motor section and the casing member covering the control circuit section.

According to the present invention, the partition may be formed with a resinous material.

According to the present invention, the partition may be formed by the casing member covering the control circuit section, and the casing member may be formed with a resinous material.

According to the present invention, the power source and the connector for signal input may be provided integrally with the casing member.

According to the present invention, the coils may be electrically connected with the control circuit section by a connection terminal which passes through the partition, and the partition through-hole for the connection terminal may be sealed by a seal member.

According to the present invention, the fitting portion of the housing and the casing member may be adapted to have at least one of a waterproofing function and a dustproofing function.

According to the present invention, a seal member may be provided in the fitting portion of the housing and the casing member.

According to the present invention, the housing and the casing member may be formed with a resinous material, the housing and the casing member may be joined by partially or completely fusing the fitting portion of the housing and the casing member.

According to the present invention, the position detection means may function by magnetic detection.

According to the present invention, the position detection means may be provided with a permanent magnet and a Hall device.

According to the present invention, the magnet for the position detection means may be provided as a second permanent magnet which is a separate component from the first permanent magnet.

According to the present invention, the partition may be arranged between the second permanent magnet and the Hall devices.

According to the present invention, the second permanent magnet may be formed with a plastic magnet.

According to the present invention, the second permanent magnet may be adapted to rotate together with the rotor.

According to the present invention, the rotor and the second permanent magnet may be integrally fixed by plastic deformation of at least one of them.

According to the present invention, the rotor and the second permanent magnet may be integrally fixed by thermal deformation of at least one of them.

According to the present invention, a positioning member for determining the magnetic pole positions of the second permanent magnet may be arranged between the rotor and the second permanent magnet.

According to the present invention, the positioning member may be constituted by a projection provided on one of the rotor and the second permanent magnet and a notch provided on the other of the rotor and the second permanent magnet, the positioning member positioning the second permanent magnet by meshing the projection with the notch.

According to the present invention, the positioning member may be a locating pin.

According to the present invention, the Hall devices may be disposed opposite to the position at which the second permanent magnet generates a maximum magnetic flux.

According to the present invention, the number of magnetic poles in the second permanent magnet may be twice the number of magnetic poles in the first permanent magnet.

DETAILED DESCRIPTION OF THE EXEMPLARY EMBODIMENTS

The invention will now be described with reference to the accompanying drawings.

Embodiment 1

Figure 1:
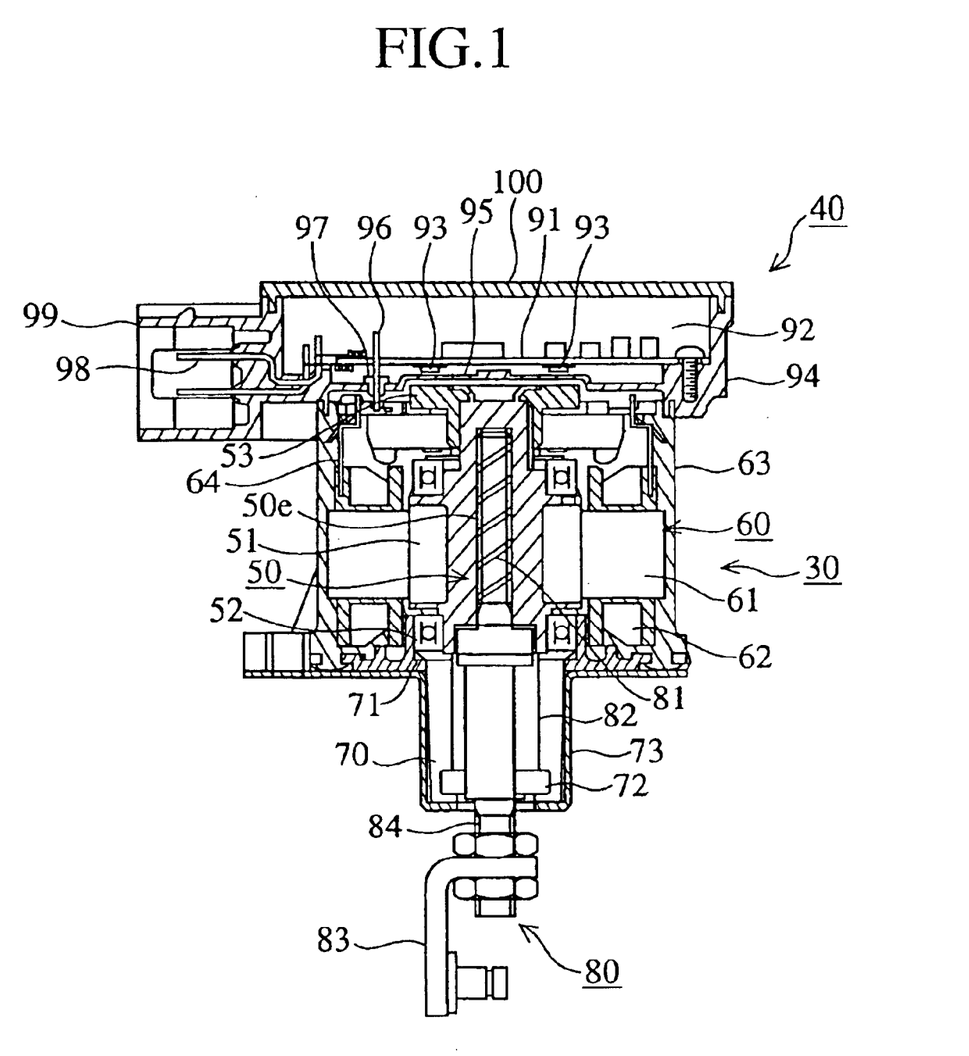
FIG. 1 is an axial sectional view of a brushless DC motor according to a first embodiment of the present invention.

FIG. 1 shows an axial sectional view of a brushless DC motor according to a first embodiment of the present invention. In the figure, reference numeral 30 denotes a motor section, 40 is a control circuit section, 50 is a rotor, 51 is a first permanent magnet, 52 is a bearing, and 53 is a second permanent magnet. The first permanent magnet 51 is magnetized with the plural magnetic poles and is disposed on an outer peripheral face of the rotor 50. The bearings 52 are arranged on both end sides of the first permanent magnet 51 so as to sandwich the first permanent magnet 51. Furthermore, the second permanent magnet 53 is attached on an opposite side to the output side of the rotor 50.

The rotor 50 is made of a PPS resin, a threaded hole is provided in the central axial portion of the rotor 50. The first permanent magnet 51 is of a ferritic magnet and is integrally formed on the outer periphery of the rotor 50 with the insert molding. The second permanent magnet 53 is formed with a neodymium-iron type plastic magnet and is mounted on one end portion of the rotor 50. Both are fixed by adapting either one of these components to completely or partially undergo plastic deformation or thermal deformation.

When mounting the first and second permanent magnet 51 and 53, a positioning mechanism is essential in order to ensure a fixed positional relationship between magnetic pole positions of the first permanent magnet 51 and magnetic pole positions of the second permanent magnet 53. This mechanism can be realized for example by a key which meshes with a key groove. Such a mechanism is described in detail below. Furthermore, it is preferred that the resinous material for the rotor 50 has equivalent properties to a PPS resin or superior properties with respect to heat resistance or molding.

Reference numeral 60 denotes a stator, 61 is a core, 62 is a coil, 63 is a housing, and 64 is a coil terminal. The stator 60 has three-phase coils 62 wound on the core 61. The core 61 is disposed so that the magnetic poles of the stator 60 are arranged on the outer side of the first permanent magnet 51 of the rotor 50 with a predetermined interval. 63 is a housing which retains the stator 60, and 64 is a coil terminal provided on the ends of the coil 62.

The housing 63 is formed with a PPS resin and is formed by insert molding in a shape which enables retaining the coil terminal 64 in a predetermined position while storing the stator 60. However, it is preferred that the constituent material of the housing 63 has equivalent properties to the PPS resin or superior properties with respect to the heat resistance or molding characteristics.

Reference numeral 70 denotes a boss, 71 is preloading spring, 72 is a rotation stop member, and 73 is a cover plate. The boss 70 is mounted on one end portion of the housing 63. The preloading spring 71 is disposed between the boss 70 and the bearing 52 supporting the rotor 50. Axial instability in the rotor 50 is eliminated by applying a predetermined urging force to the rotor 50. The inner hole of the rotation stop member 72 is formed so that a section of the circular contour is linear and is formed by insert molding in the boss 70.

The boss 70 is sealed in an air-tight manner with respect to the housing 63 of the stator 60 and is fixed by threadable attachment, heat caulking or the like.

Furthermore, the cover plate 73 is a protective plate formed by a drawing process. Claws (not shown) provided partially are fixed by caulking into a collar (not shown) on the housing 63.

Since the cover plate 73 is provided in order to strengthen the boss 70 and improve the sealing performance of the seal portion, the cover plate 73 may be omitted when this is not required. Furthermore, although the boss 70 is formed with a PPS resin, it is preferred that the material used has equivalent properties to the PPS resin or superior properties with respect to heat resistance or molding characteristics.

Reference numeral 80 denotes an output shaft, 81 is a threaded section, 82 is a D-cut section, 83 is an arm, and 84 is an arm fixing section. The threaded section 81 is arranged on a side opposite to an output side of the output shaft 80, the threaded section 81 is inserted into the threaded hole 50e provided in the rotor 50 to mesh therewith. The D-cut section 82 is provided in approximately a central portion of the output shaft 80 and passes through the rotation stop member 72 provided in the boss 70. The D-cut section 82 has a D-shaped cross section to fit with the hole portion provided in the rotation stop member 72.

Thus, the rotational force is transmitted to the output shaft 80 as a result of the rotor 50 rotating due to the application of a current to the motor. Due to the fact that the rotation of the output shaft 80 is hindered due to meshing of the D-cut section 82 with the rotation stop member 72, the rotational force of the rotor 50 is converted into a thrust force in an axial direction by the presence of the rotation stop member 72 and the threaded section 81 which are meshed with each other inside the rotor 50. The output shaft 80 can be displaced only in the axial direction by the conversion mechanism.

Although one of the arms 83 is connected to the arm fixing section 84 of the output shaft 80 and the other of the arms 83 is connected to a driven apparatus, no particular connection method or shape is specified.

Reference numeral 91 denotes a base plate, 92 is an electronic component, 93 is a Hall device, 94 is a first casing, 95 is a partition, 96 is a connection terminal, 97 is a seal member, 98 is a terminal, 99 is a connector, and 100 is a second casing.

The electronic components 92 which are required to drive and control the brushless DC motor is arranged on an upper face of the base plate 91 in the control circuit section 40. Three Hall devices 93 acting as a position detection means are arranged on the rear face of the base plate 91 in order to detect the rotation position of the rotor 50 by detecting a leakage flux from the second permanent magnet 53.

The control circuit section 40 is stored in the first casing 94 and is supplied with current from a power source through electrical connection with the terminal 98 of the connector 99 which is integrated with the first casing 94. The bottom of the first casing 94 serves as a partition 95 between the motor 30 and the control circuit section 40, the space in the motor section 30 is completely separated from the space in the control circuit section 40 by the partition 95, thereby to reduce the influence of heat from the motor section 30 onto the control circuit section 40.

The coil terminals 64 connected with the coils 62 are electrically connected with the control circuit section 40 by the connection terminal 96 and a drive signal from the control circuit section 40, that is to say, electrical power is supplied to each coil 62.

Although the coil terminal 64 has been described herein as a separate component from the connection terminal 96, it is preferred that both components are integrated into a single component and one end of the coil terminal 64 is connected directly to the base plate 91.

The section at which the connection terminal 96 penetrates the partition 95 is completely sealed by a seal member 97 made of rubber or soft resinous material in order to maintain an air-tight seal between the motor section 30 and the control circuit section 40.

Figure 2A:
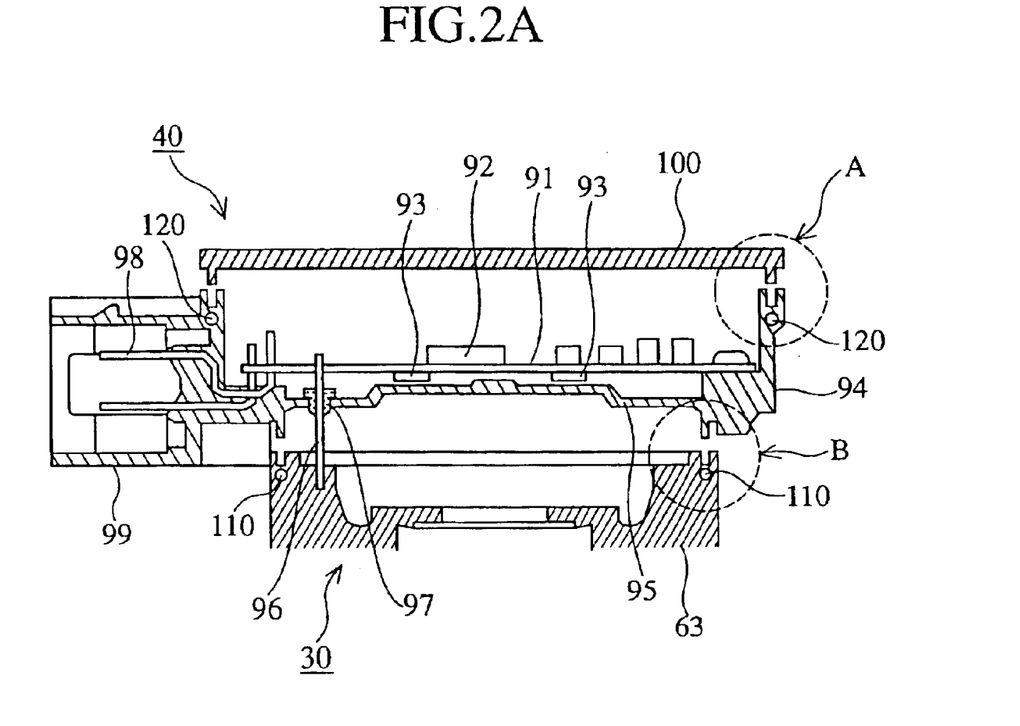
FIG. 2 is a partial sectional view of a brushless DC motor according to the first embodiment of the present invention.
Figure 2B:
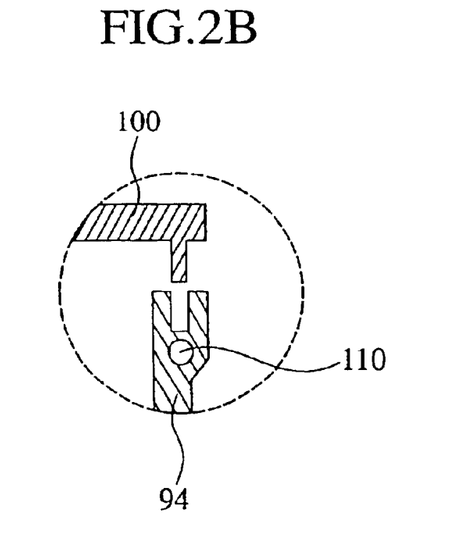
Figure 2C:
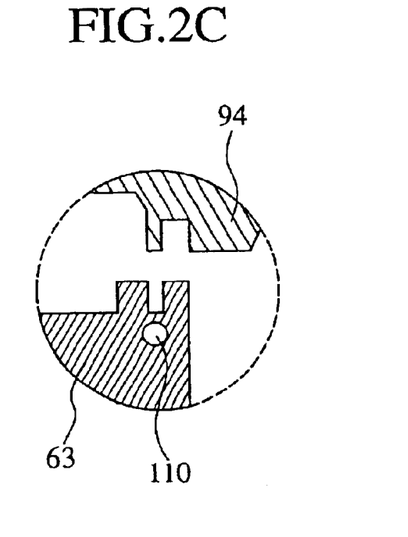

The connection between the motor section 30 and the control circuit section 40 is described below with reference to FIG. 2A to FIG. 2C. FIG. 2A is a partial sectional view of a brushless DC motor according to the first embodiment of the present invention. FIG. 2B is an enlarged view of section A in FIG. 2A. FIG. 2C is an enlarged view of section B in FIG. 2A. The section A corresponds to a joint portion of the first casing 94 with the second casing 100, and the section B corresponds to a joint portion of the first casing 94 with the housing 63.

As shown in the figures, the respective joint portions of the first casing 94 with the housing 63 and with the second casing 100 are in the form of a socket and spigot joint, metal wires 110 and 120 are buried respectively in the housing 63 and the first casing 94 by insert molding.

Thus, in an assembling step of the components, after fitting the joint portions, the metal wires 110 and 120 are heated by applying current to the metal wires 110 and 120 in order to fuse and fix the joint portions. In this manner, it is possible to maintain the airtight characteristics of the joint portions between the components.

Although connection by fusion has been described herein, it is possible to provide a seal by packing or by a liquid seal or the like.

Next, a method of mounting the second permanent magnet 53 on the rotor 50 will be described with reference to FIG. 3.

In the figure, reference numeral 50 denotes a rotor, and 53 is a second permanent magnet. 50a is a fitting section for supporting the second permanent magnet 53, which is arranged in an end portion of the rotor 50. 50b is a projection portion which projects from the tip of the fitting section 50a and has a tubular shape. 50c is a positioning projection which projects from an outer peripheral face of the fitting section 50a in its radial direction. 53c is a notch which engages with the positioning projection 50c when the second permanent magnet 53 is attached to the rotor 50.

A position limiting means is required to make the magnetic pole positions of the first permanent magnet 51, which is disposed on the rotor 50, and the magnetic pole positions of the second permanent magnet, which is used for positional detection of the rotor, have a predetermined positional relationship. Thus, when mounting the second permanent magnet 53 on the fitting section 50a, it is possible to position both components 50a, 53 accurately. Furthermore, since the rotor 50 and the second permanent magnet 53 may be formed by resin molding, it is possible to easily provide the notch 53c and the positioning projection 50c on the components without the need for specific processing.

The shape of each component 50c and 53c is not particularly limited since it is an object to restrict their positional relationship by the engagement with each other.

Another method for a positional limiting means will be described below with reference to FIG. 4.

In the figure, 50 denotes a rotor and 53 is a second permanent magnet. 50a is a fitting section for supporting the second permanent magnet 53, which is arranged in an end portion of the rotor 50. 50b is a projection portion which projects from the tip of the fitting section 50a and has a tubular shape. 50d is a first hole which is provided on an outer peripheral face of the fitting section 50a. 53d is a second hole which is provided on an outer peripheral face of the insertion section of the second permanent magnet 53 fitted to the fitting section 50a. 130 is a locating pin. Thus, when attaching the second permanent magnet 53 to the rotor 50, the first hole 50d and the second hole 53d are aligned with each other, the locating pin 130 is inserted to extend over both holes. As a result, it is possible to limit the positions of both components.

Figure 3:
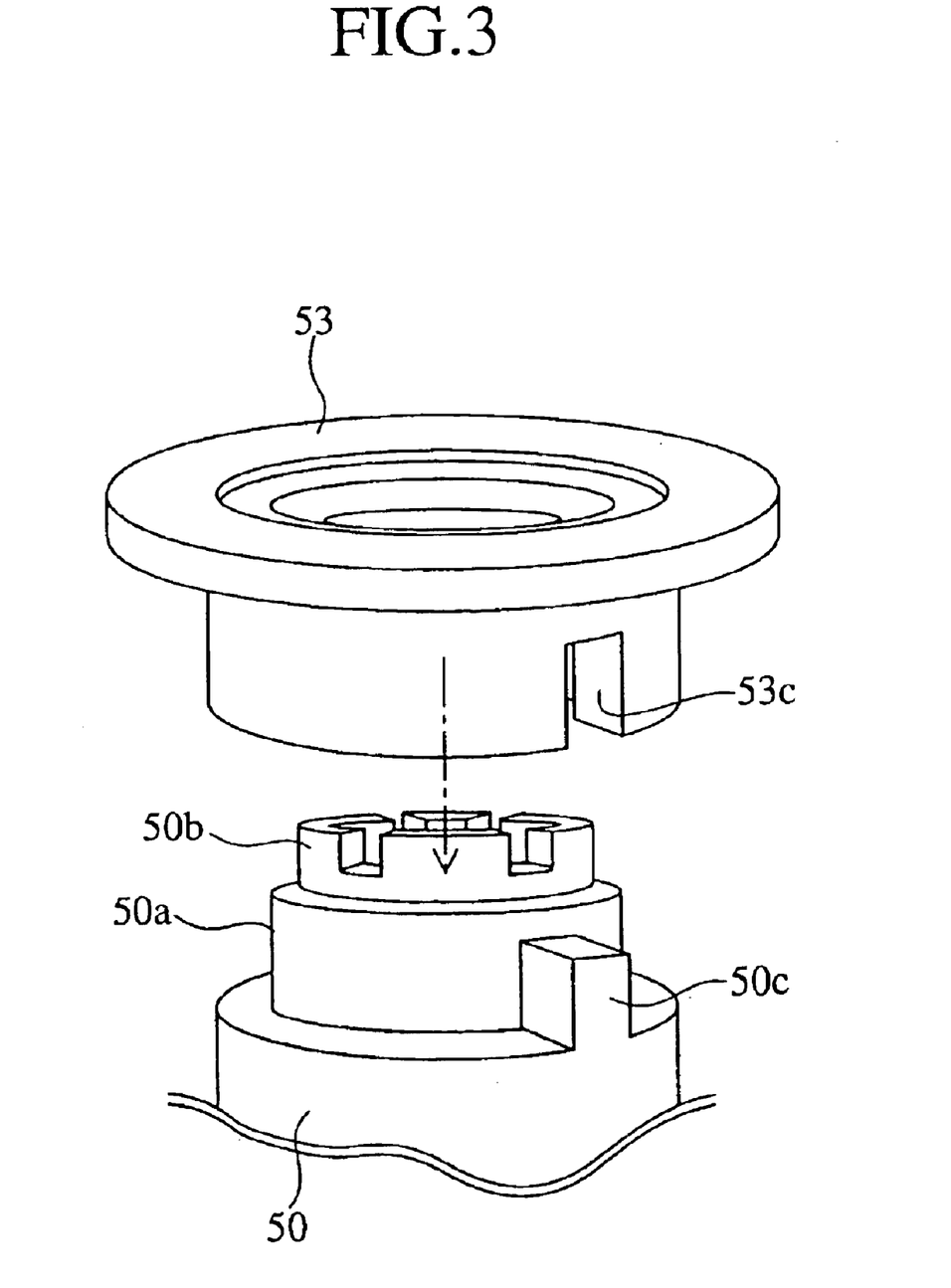
FIG. 3 is a partial perspective view describing a positioning means for the rotor and the second permanent magnet in the brushless DC motor according to the first embodiment of the present invention.

It is preferred to provide a guiding mechanism for attaching the second permanent magnet 53 to the rotor 50, for example, a guiding groove as shown in FIG. 3, and then insert the locating pin 130. In this manner, reliability can be improved due to the fact that it is not only possible to prevent positional deviation in a circumferential direction, but also it is possible to prevent positional deviation in an axial direction.

Figure 5:
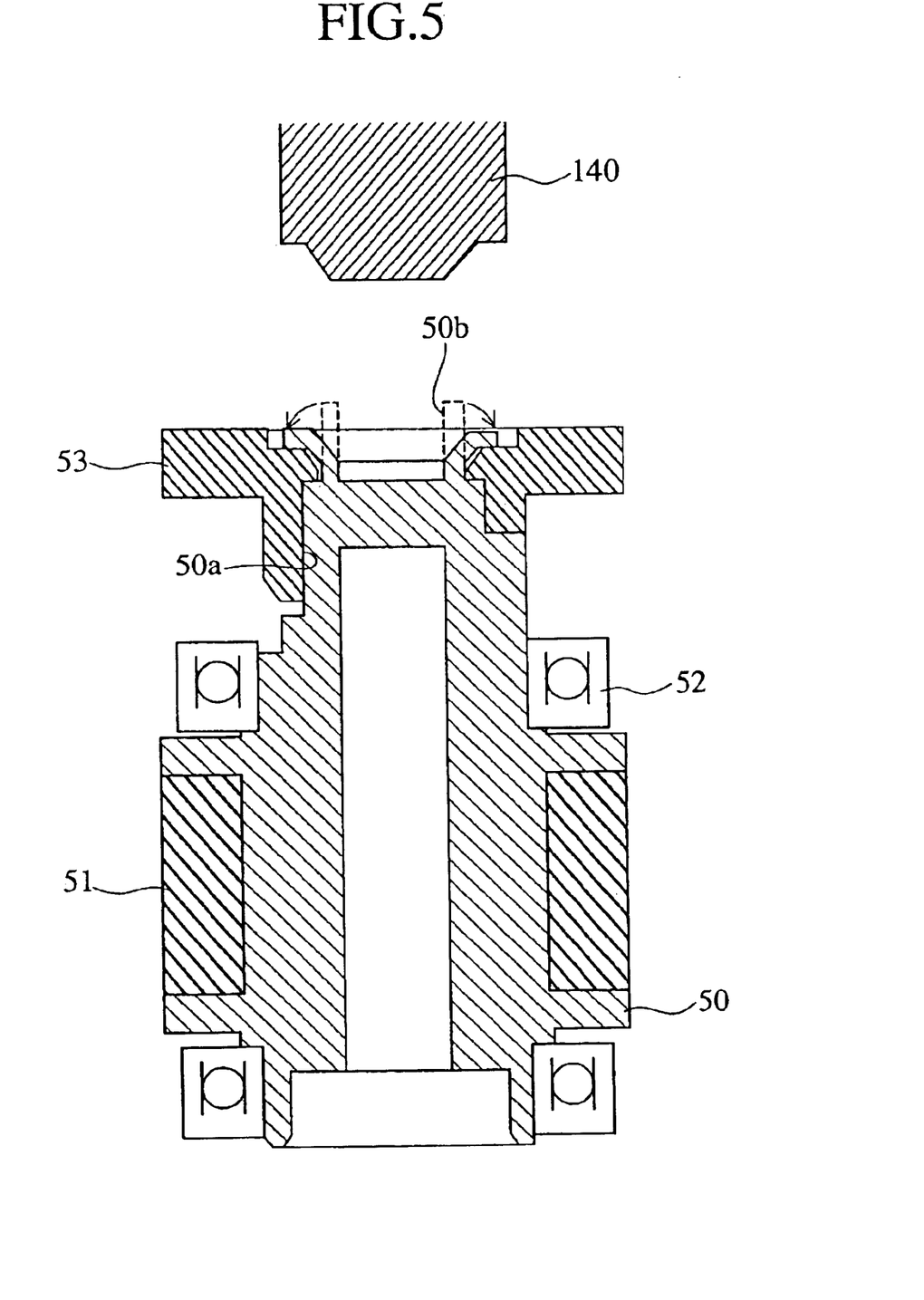
FIG. 5 is a partial sectional view describing an axial fixing means for the rotor and the second permanent magnet in the brushless DC motor according to the first embodiment of the present invention.

Next, a method of fixing the rotor and the second permanent magnet in an axial direction will be described below with reference to FIG. 5.

In the figure, 50 denotes a rotor, 51 is a first permanent magnet, 52 is a bearing, and 53 is a second permanent magnet. 50b is a projection portion which projects from the tip of the fitting section 50a and has a tubular shape, as described with reference to FIG. 3 above. 140 is a processing jig for deforming the projection portion 50b after the attachment of the second permanent magnet 53 to the rotor 50.

The broken line in the figure shows a projection portion 50b before deformation, caulking deformation or plastic deformation is done in the direction of the arrow by pressing the projection portion 50b with the processing jig 140.

Figure 4:
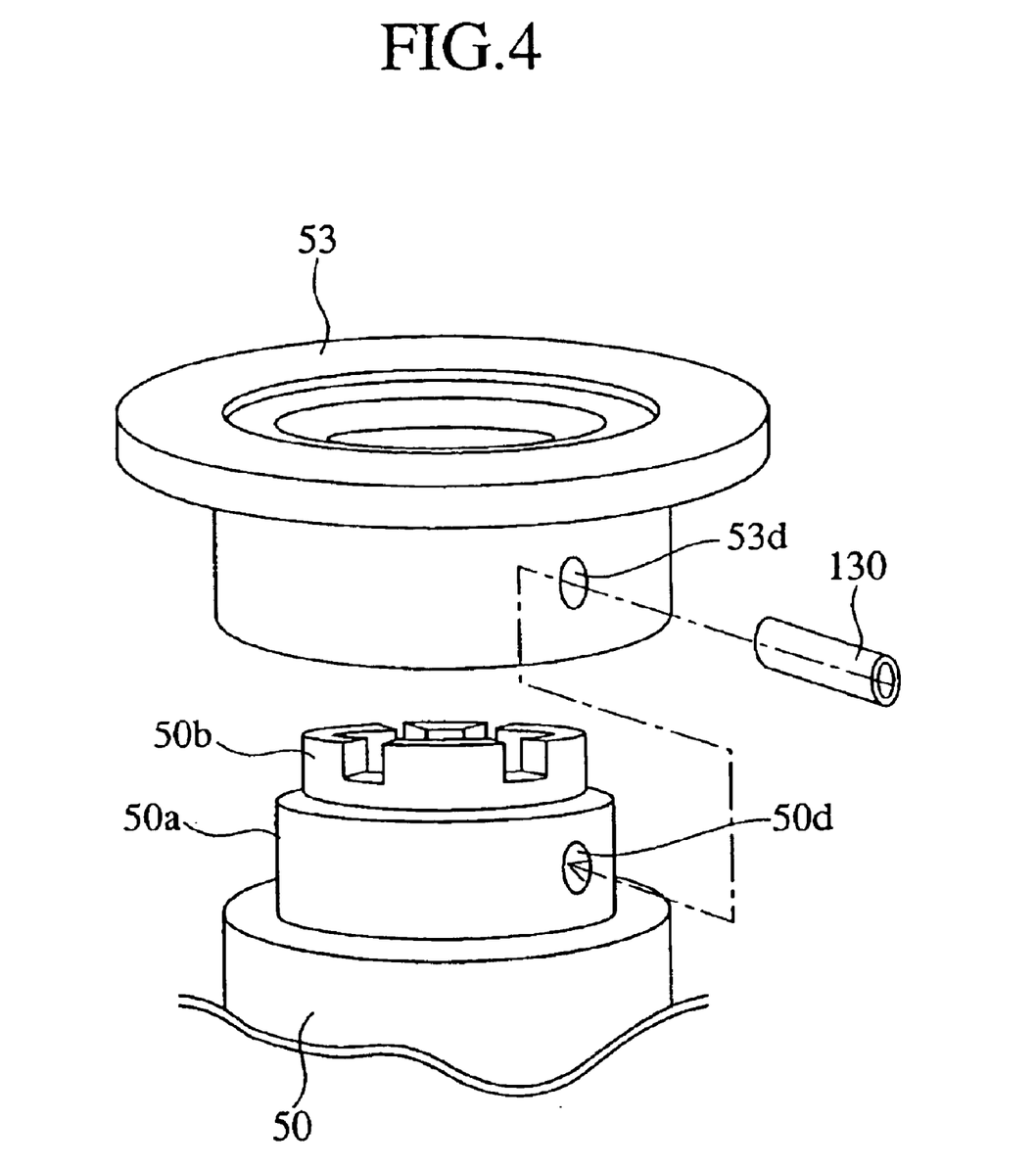
FIG. 4 is a partial perspective view describing another positioning means for the rotor and the second permanent magnet in the brushless DC motor according to the first embodiment of the present invention

The projection portion 50b is, as shown in FIG. 3 and FIG. 4, partially divided in a circumferential direction into a plurality of blocks in order to facilitate the plastic deformation or caulking deformation. Furthermore, in this manner, it is possible to prevent cracking and chipping in the deformed portion.

Furthermore, when the projection portion 50b is made of a resinous material, it is possible to further improve the processing efficiency by heating the processing jig to a predetermined temperature. For example, a heating operation of burying a lead wire into the jig and applying current to the lead wire is considered as a heating method. However, neither the method nor the material is limited in this respect.

Figure 6:
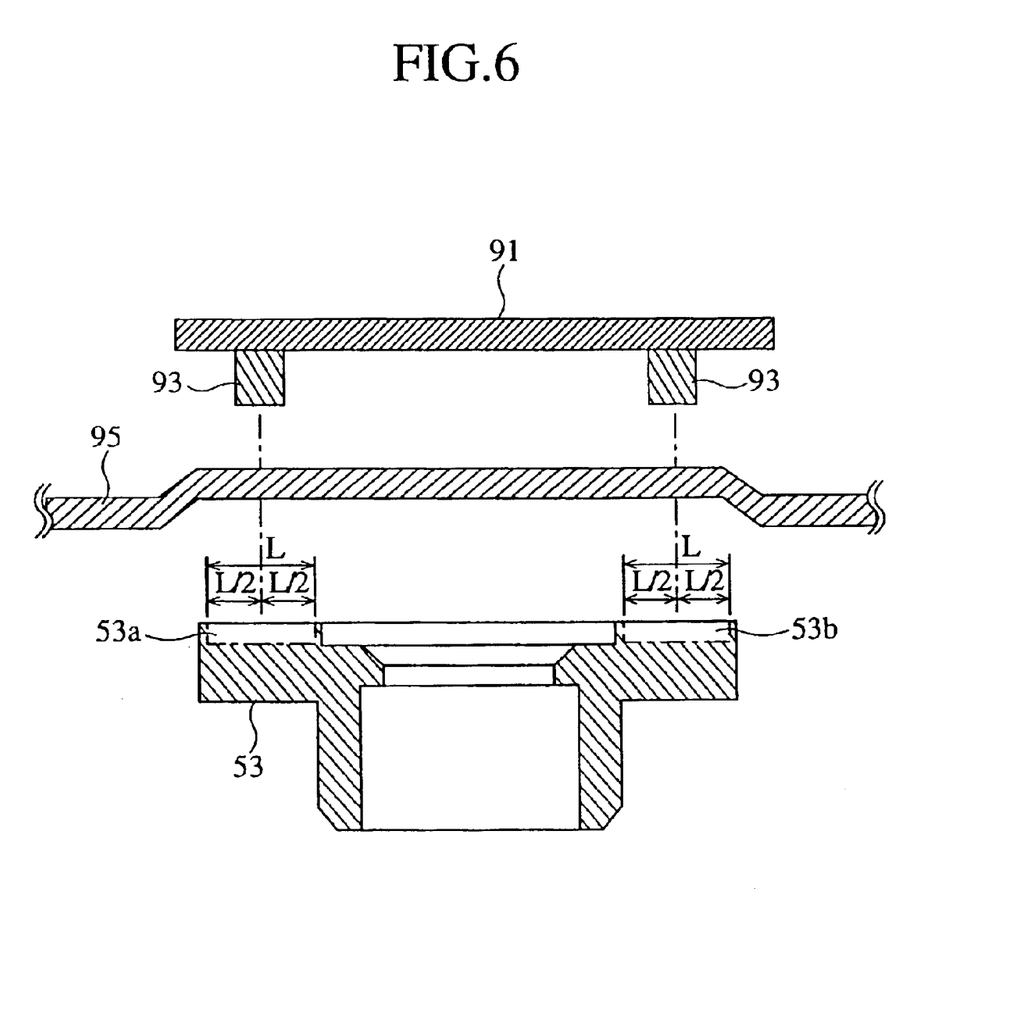
FIG. 6 is a partial sectional view describing the positional relationship between the Hall element and a magnetized face of the second permanent magnet in the brushless DC motor according to the first embodiment of the present invention.

The optimal positional relationship of the second permanent magnet 53 and the Hall device 93 for detecting the leakage flux from the second permanent magnet 53 will be described below with reference to FIG. 6. In the figure, 53 denotes a second permanent magnet and 53a, 53b are magnetic poles on the second permanent magnet 53. 95 is a partition formed by the bottom of the first casing 94. 91 is a base plate on which electronic components for controlling the rotation of the motor are mounted. Hall devices 93 are arranged on the rear face of the base plate 91.

When a radial width of the magnetized faces 53a, 53b of the second permanent magnet 53 is taken to be L, it is preferred that the center of the Hall devices 93 is placed approximately in a central position of each magnetized face, that is to say, at a position L/2 of each magnetized face as shown in the figure. In other words, it is preferred that the positional relationship of the Hall devices 93 and the magnetized faces 53a, 53b is set so that amount of the leakage flux detected by the Hall devices is maximized.

Next, the relationship between the number of magnetic poles of the first permanent magnet and the number of magnetic poles of the second permanent magnet will be described below.

The brushless DC motor detects variations in the leakage flux from each magnetic pole of the second permanent magnet by the Hall devices and determines the timing by which current-carrying pattern is changed. However, it is generally the case that the variation in output signal from the Hall devices and the timing by which the current-carrying pattern is changed display one to one correspondence. Thus, when the signal undergoes variation, the current-carrying pattern has been changed.

For example, when there are twelve magnetic poles in the first permanent magnet, twelve magnetic poles are provided necessarily in the second permanent magnet. However, if twelve magnetic poles are provided in the first permanent magnet and twenty-four magnetic poles are provided in the second permanent magnet, the current-carrying pattern which is changed with the variation in signals from the Hall devices is only changed once when the signals from the Hall devices are varied twice. Thus, a motor with equivalent performance characteristics can be obtained.

The brushless DC motor of the present invention can be adapted for various uses and is particularly useful for use with on-vehicle equipments requiring durability and downsizing. Further, the brushless DC motor may be used as a drive source for opening and closing throttle valves and EGR valves or used as a drive source for the movable vane in a VG turbo system.

As described above, according to the present invention, a brushless DC motor comprises: a motor section which has a rotor, a stator, and a housing; a control circuit section which is integrated with the motor section and separated from the motor section by a partition; and a casing member which covers the control circuit section to isolate it from the external environment, wherein the positional detection means is arranged outside of the bearing member with respect to an axial direction. Thus, the control circuit section can be arranged in a space isolated from the coils. As a result, it is possible to conspicuously reduce the influence on the control circuit section by heat generation from the coils.

Furthermore, since the motor section and the control circuit section are isolated from each other by a partition, it is possible to prevent entry of moisture and metallic particles from the motor section.

According to the present invention, the partition is formed by at least one of the housing of the motor section and the casing member covering the control circuit section. Thus, for example by making the bottom face of the casing member storing the control circuit section the partition face, it is possible to form the partition in an extremely simple manner by merely mounting the-casing member storing the control circuit section on the housing of the motor section.

According to the present invention, the casing member covering the control circuit section is formed from a resinous material and the partition is formed from the resinous material of the casing member. Thus, it is not necessary to provide a separate partition between the space on the motor side and the space on the control circuit side.

According to the present invention, the power source and the connector for signal input are integrally formed on the casing member which is formed from the resinous material and stores the control circuit section. Thus, it is possible to improve productivity.

According to the present invention, the motor coils and the control circuit are electrically connected by a connection terminal which passes through the partition, namely, the bottom face of the casing member storing the control circuit section. Further, the partition through-hole for the connection terminal is sealed with a seal member. Thus, it is possible to completely prevent the entry of moisture or dust from the motor section into the control circuit section.

According to the present invention, a seal member is provided in the fitting portion of the housing and the casing member which has at least one of a waterproofing function and a dustproofing function. Thus, it is possible to completely prevent the entry of dust or moisture from the outside into the motor section and the control circuit section.

According to the present invention, both the motor housing and the casing member for the control circuit section are formed by a resinous material, both components are joined by partially or completely fusing the fitting portion of them. Thus, it is possible to completely prevent the entry of dust or moisture from the outside without using a specific seal member.

According to the present invention, the position detection means for detecting the rotation position of the rotor is characterized by a magnetic detection means using Hall elements to detect the leakage flux in an axial direction from the second permanent magnet disposed on an axial end face of the rotor, and further, the partition is provided between the second permanent magnet and the Hall devices. This arrangement affords greatly improved protection against thermal deterioration of electronic components since it is possible to reduce the heat transmission to the magnetic flux detection elements and the control circuit components without deterioration in the rotation position detection accuracy.

According to the present invention, the second permanent magnet is formed from a plastic magnet and is adapted to rotate together with the rotation of the rotor. Thus, it is possible to accurately detect the rotation position of the rotor. Furthermore, since the second permanent magnet is formed from a highly-moldable plastic magnet, it is possible to provide a rotation position detection means capable of improving the productivity.

According to the present invention, the second permanent magnet is fixed to the rotor by allowing for at least one of the rotor and the second permanent magnet to undergo plastic deformation or heat deformation. Thus, it is possible to prevent increases in the number of components without requiring designated fixing components.

According to the present invention, a positioning member is provided between the rotor and the second permanent magnet, the positioning member comprises a projection which is provided on one of the rotor and the second permanent magnet, and a notch which is provided on the other of the rotor and the second permanent magnet and engages with the projection. Alternatively, both components may be positioned with a locating pin. Thus, since the pole positions of the first permanent magnet is set accurately in a predetermined positional relationship with the pole positions of the second permanent magnet, assembly errors can be prevented Furthermore, it is possible to eliminate excessive assembly operations to set these components in the predetermined positional relationship.

According to the present invention, the Hall devices are arranged on a side of the control circuit section with respect to the partition and opposite to the position at which the second permanent magnet generates maximum magnetic flux. Thus, it is possible to improve the positional detection accuracy.

According to the present invention, the number of magnetic poles in the second permanent magnet is set to be twice that in the first permanent magnet. This allows for a double improvement in the positional detection accuracy.

What is claimed is:

1. A brushless DC motor comprising:
    a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;
    a position detection means for detecting a rotation position of the rotor; and
    a control circuit section for controlling the application of current to the coils in accordance with the position of the rotor detected by the position detection means, said control circuit section being integrated with the motor section,
    wherein a partition is provided between the motor section and the control circuit section, a casing member is provided to isolate the control circuit section from an external environment,
    wherein said position detection means is disposed outside of a bearing member with respect to an axial direction, said bearing member rotatable supporting the rotor,
    wherein said partition is formed with a resinous material, and
    wherein said coils are electrically connected with said control circuit section by a connection terminal which passes through the partition, a partition through-hole for the connection terminal is sealed by a seal member.

2. A brushless DC motor comprising:
    a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;

a position detection means for detecting a rotation position of the rotor; and a control circuit section for controlling the application of current to the coils in accordance with the position of the rotor detected by the position detection means, said control circuit section being integrated with the motor section, wherein a partition is provided between the motor section and the control circuit section, a casing member is provided to isolate the control circuit section from an external environment, wherein said position detection means is disposed outside of a bearing member with respect to an axial direction, said bearing member rotatable supporting the rotor, wherein said partition is formed with a resinous material, wherein said position detection means functions by magnetic detection, wherein said position detection means comprises a second permanent magnet and a Hall device, and wherein said second permanent magnet is formed with a plastic magnet.

3. A brushless DC motor comprising:

a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;

a position detection means for detecting a rotation position of the rotor; and a control circuit section for controlling the application of current to the coils in accordance with the position of the rotor detected by the position detection means, said control circuit section being integrated with the motor section, wherein a partition is provided between the motor section and the control circuit section, a casing member is provided to isolate the control circuit section from an external environment, wherein said position detection means is disposed outside of a bearing member with respect to an axial direction, said bearing member rotatably supporting the rotor, wherein said partition is formed with a resinous material, wherein said position detection means functions by magnetic detection, wherein said position detection means comprises a second permanent magnet and a Hall device, wherein said second permanent magnet is adapted to rotate together with the rotor, and wherein said rotor and said second permanent magnet are fixed to each other by plastic deformation or thermal deformation of at least one of the rotor and the second permanent magnet.

4. A brushless DC motor comprising:

a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;

a position detection means for detecting a rotation position of the rotor; and a control circuit section for controlling the application of current to the coils in accordance with the position of the rotor detected by the position detection means, said control circuit section being integrated with the motor section, wherein a partition is provided between the motor section and the control circuit section, a casing member is provided to isolate the control circuit section from an external environment, wherein said position detection means is disposed outside of a bearing member with respect to an axial direction, said bearing member rotatable supporting the rotor, wherein said partition is formed with a resinous material, wherein said position detection means functions by magnetic detection, wherein said position detection means comprises a second permanent magnet and a Hall device, wherein a positioning member for positioning the second permanent magnet is disposed between the rotor and the second permanent magnet, and wherein said positioning member is constituted by a projection provided on one of the rotor and the second permanent magnet and a notch provided on the other of the rotor and the second permanent magnet, said positioning member positions the second permanent magnet by engagement of the projection with the notch.

5. A brushless DC motor comprising:

a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;

a position detection means for detecting a rotation position of the rotor; and a control circuit section for controlling the application of current to the coils in accordance with the position of the rotor detected by the position detection means, said control circuit section being integrated with the motor section, wherein a partition is provided between the motor section and the control circuit section, a casing member is provided to isolate the control circuit section from an external environment, wherein said position detection means is disposed outside of a bearing member with respect to an axial direction, said bearing member rotatable supporting the rotor, wherein said partition is formed with a resinous material, wherein said position detection means functions by magnetic detection, wherein said position detection means comprises a second permanent magnet and a Hall device, and wherein said Hall device are disposed opposite to a position at which the second permanent magnet generates maximum magnetic flux.

6. A brushless DC motor comprising:

a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;

a position detection means for detecting a rotation position of the rotor; and a control circuit section for controlling the application of current to the coils in accordance with the position of the rotor detected by the position detection means, said control circuit section being integrated with the motor section, wherein a partition is provided between the motor section and the control circuit section, a casing member is provided to isolate the control circuit section from an external environment, wherein said position detection means is disposed outside of a bearing member with respect to an axial direction, said bearing member rotatably supporting the rotor, wherein said partition is formed with a resinous material, wherein said position detection means functions by magnetic detection, wherein said position detection means comprises a second permanent magnet and a Hall device, and wherein the number of magnetic poles of the second permanent magnet is twice that of the first permanent magnet.

7. A brushless DC motor comprising:

a motor section provided with a rotor, a stator and a housing, said rotor having a first permanent magnet on an outer periphery, the first permanent magnet having a plurality of magnetic poles, said stator being disposed facing the outer periphery of the rotor and held by the housing, said stator having a plurality of coils and generating a rotational force to the rotor by applying current to the coils;

a position detection means for detecting a rotation position of the rotor; and a control circuit section for controlling the application of current to the coils in accordance with the position of the rotor detected by the position detection means, said control circuit section being integrated with the motor section, wherein a partition is provided between the motor section and the control circuit section, a casino member is provided to isolate the control circuit section from an external environment, wherein said position detection means is disposed outside of a bearing member with respect to an axial direction, said bearing member rotatable supporting the rotor, wherein said partition is formed with a resinous material, wherein said position detection means functions by magnetic detection, wherein said position detection means comprises a second permanent magnet and a Hall device, and wherein the Hall device is arranged on a rear face of a base plate.

8. The brushless DC motor according to claim 7, wherein said base plate is disposed above said partition.

* * * * *